April 6, 1965 F. LA MONICA Re. 25,758

APPARATUS FOR MOLDING CONCRETE OR LIKE PLASTIC PRODUCTS

Original Filed Aug. 28, 1962 2 Sheets-Sheet 1

INVENTOR
FRANK LA MONICA
Joseph R. Spalla
ATTORNEY

APPARATUS FOR MOLDING CONCRETE OR LIKE PLASTIC PRODUCTS

Original Filed Aug. 28, 1962 2 Sheets-Sheet 2

INVENTOR
FRANK LA MONICA
Joseph R. Spalla
ATTORNEY

United States Patent Office

Re. 25,758
Reissued Apr. 6, 1965

25,758
APPARATUS FOR MOLDING CONCRETE OR LIKE PLASTIC PRODUCTS

Frank La Monica, Avon, Conn., assignor to A. Rontondo & Sons, Avon, Conn., a corporation of Connecticut Original No. 3,136,024, dated June 9, 1964, Ser. No. 219,837, Aug. 28, 1962. Application for reissue Oct. 12, 1964, Ser. No. 416,663
15 Claims. ( Cl. 25—130)

Matter enclosed in heavy brackets [ ] appears in the original patent but forms no part of this reissue specification; matter printed in italics indicates the additions made by reissue.

This invention relates to apparatus for molding concrete or like plastic products; more particularly it relates to apparatus for molding concrete tank sections characterized by mechanism for breaking the bond between a formed tank section and its mold in a facile manner; and specifically it relates to apparatus for molding concrete tank sections provided with mechanism constructed and arranged to support said mold apparatus for positive movement relative to columnar supports adapted to support a formed tank section in a horizontal plane during and subsequent to said movement whereby the bond between tank section and its mold is broken.

Apparatus for molding upper and lower concrete septic tank sections which are subsequently joined to form a tank are known to the art. The problem not heretofore satisfactorily solved from the standpoint of simplicity and more importantly from the standpoint of labor economy has been the breaking of the bond between a formed tank section and the mold defining the inner walls of the tank section. Unless the bond is broken simultaneously at all points the tank section is likely to crack. Screw jacks at each corner of the mold have been advanced but this arrangement is unsatisfactory as it requires an experienced workman or workmen to operate the screw jacks a little at a time in turn or simultaneously. Other proposals provide a collapsible or flexible inner tank wall mold but these are unsatisfactory in that the mold structure is complicated as are the mechanisms for collapsing or flexing the mold. Further such proposals do not lend themselves to the formation with the molding of a tank section of internal baffles in the tank sections. Still other proposals require that the mold defining the outer tank walls together with the formed tank be forcibly cammed upwardly relative to the mold defining the inner walls of the tank. This type of apparatus aside from assembly and disassembly problems if not properly and carefully set up is likely to damage the tank section.

In accordance with the present invention there is provided a unitary apparatus for molding tank sections in which a rigid mold core defining the inner walls of a tank section and spaced outer wall forms defining the outer walls of the tank section are always joined; the outer wall forms being hinged to a flange extending horizontally outwardly from the rigid mold core whereby they are movable inwardly into mold cavity forming position and outwardly into a tank stripping and removal position. The entire mold apparatus is supported for movement between two horizontal planes relative to columnar supports which extend into the mold cavity through openings in said flanges, said columnar supports themselves partially defining the bottom of the mold cavity. Movement of the mold apparatus, after the outer wall forms have been stripped, from one to the other horizontal plane forcibly breaks the bond between tank and mold core; the tank being supported by said columnar supports during and subsequent to said movement.

A feature of the invention resides in the fact that the outer wall forms of the mold cannot be closed if the entire unitary mold apparatus is not properly positioned; nor can the formed tank section be stripped from the mold core until the outer wall forms are moved outwardly therefrom, as the lower edges of the outer wall forms which are hingedly secured to the mold core flange are adapted to overlie columnar supports which extend into the mold cavity.

Still another feature of the invention resides in the fact that the outer wall forms may be adjustably spaced from the mold core to permit variable thickness tanks to be formed.

A further feature of the invention resides in the fact that internal baffles opposite the inlet and outlet ports of a tank section may be formed with and integral with the tank section due to the rigid unitary construction of the mold core.

An object of the invention is to provide an economical easily operated molding apparatus for facilitating the stripping of a concrete product therefrom.

A further object of the invention is in the provision of molding apparatus so constructed and arranged that a concrete product may be safely stripped from its mold by a single unskilled workman in a matter of seconds and with a minimum of effort.

A further object of the invention is to provide a mold core and attached outer wall forms which are supported for movement between two stable horizontal positions relative to supports extending into the mold cavity defined by said core and outer wall forms.

A still further object of the invention is in the provision of apparatus for molding tank sections which permits internal baffles to be integrally formed with the tank section.

Another object of the invention is in the provision of molding apparatus for septic tank sections so constructed and arranged that a mold cavity cannot be formed unless the apparatus is properly positioned and wherein the tank section cannot be stripped from the core of the mold until the outer wall forms of the mold are stripped.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
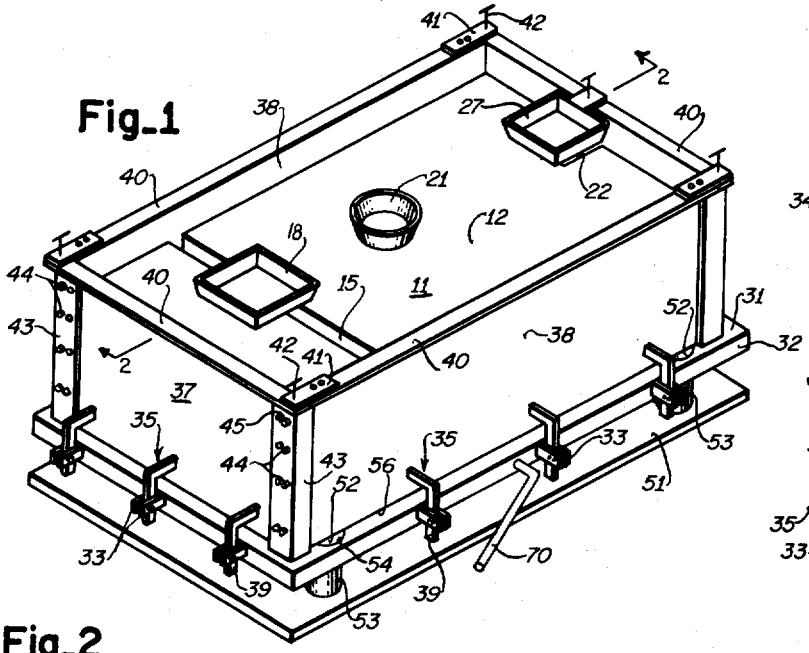
FIGURE 1 is a perspective view of apparatus for molding the top section of a concrete septic tank showing the apparatus positioned to receive a pour.
Figure 2:
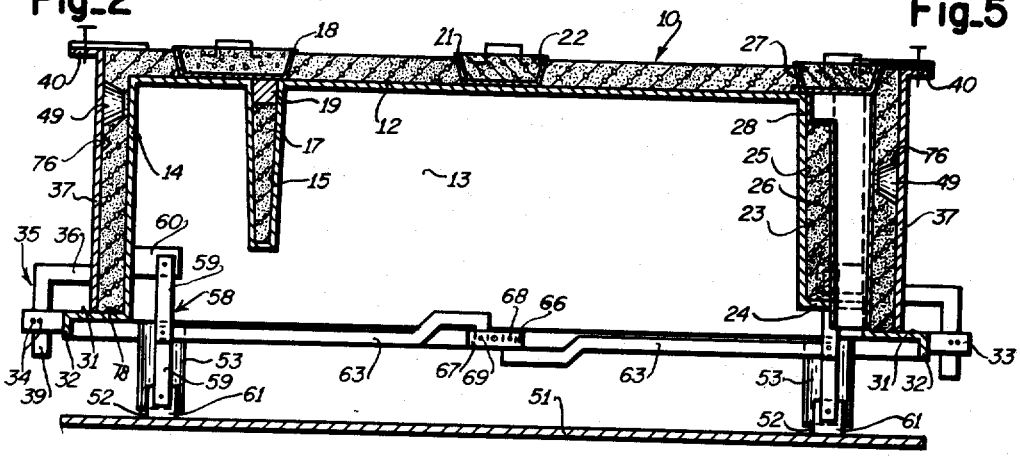
FIGURE 2 is a cross sectional view taken along lines 2—2 of FIGURE 1 showing the mold in a raised position with cement hardening in the mold cavity.
Figure 7:
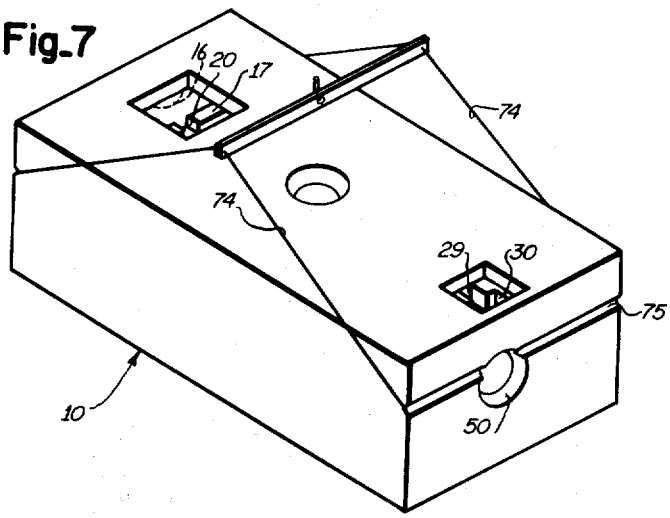
FIGURE 7 is a perspective view showing a tank section being lifted after having been stripped from the mold core.

Referring now to the drawings wherein like reference characters designate like or corresponding parts throughout the several views and wherein is shown a preferred embodiment there is shown in FIGURES 1 and 2 apparatus for forming the top section 10 (FIGURE 7) of a concrete septic tank. The apparatus comprises a substantially rectangular hollow mold core generally designated by reference numeral 11 having a top 12, and slightly tapered side 13, and end walls 14 formed of heavy gauge sheet steel. The mold core 11 adjacent the inlet end of the tank section to be formed is provided with a tapered depression 15 which extends from side to side of the mold core 11 and toward the open bottom of the mold core a predetermined distance below an inlet port 16 (FIGURE 7) whereby as more clearly seen in FIGURE 2 a baffle 17 may be formed integral with the tank section 10. As shown in FIGURES 1 and 2 a pan 18 of any suitable shape is disposed on the top of the mold core 11 and adapted to receive cement whereby, as will be understood in the art, when the cement is removed therefrom it will serve as a cover for the opening in the top of the tank defined by the configuration of the pan 18. As most clearly seen in FIGURE 2 the underside of the pan 18 is provided with a depending portion 19 of lesser width than the pan which fits into the depression 15 a predetermined distance whereby a vent opening 20 (FIGURE 7) will be formed in the baffle between the inlet and central portions of the tank section 10. A pan 21 is also disposed over the top central portion of the mold core thereby to form a cleanout opening and a cover therefor. The mold core end wall 14 defining the interior wall of the outlet end of the tank section 10 as seen in FIGURES 1 and 2 is recessed thereby forming a U-saped channel 22 between the side walls 13 of the mold core. The walls 23 of the channel extend toward the open bottom of the mold core 10 a predetermined distance below the bottom of depression 15. The lower ends of the channel walls 23 are provided with outwardly directed flanges 24 adapted to support poured concrete which flows into a cavity 25 formed by the walls 23 and a smaller dimensioned hollow rectangular sleeve 26 extending from a cover pan 27 down through the channel and past the channel flanges 24. The underside of the cover pan 27 is also provided with a projection 28, whose width is less than that of the pan and sleeve, which depends partially into the cavity 25 and serves to form a vent 29 in the rectangular baffle 30 (FIGURE 7) formed by the cavity 25 between the walls 23 thereof and sleeve 26.

Figure 5:
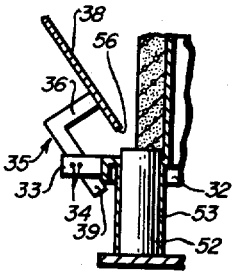
FIGURE 5 is a view similar to FIGURE 3 showing the inter-relationship of mold elements when the mold apparatus is in the FIGURE 4 position.
Figure 4:
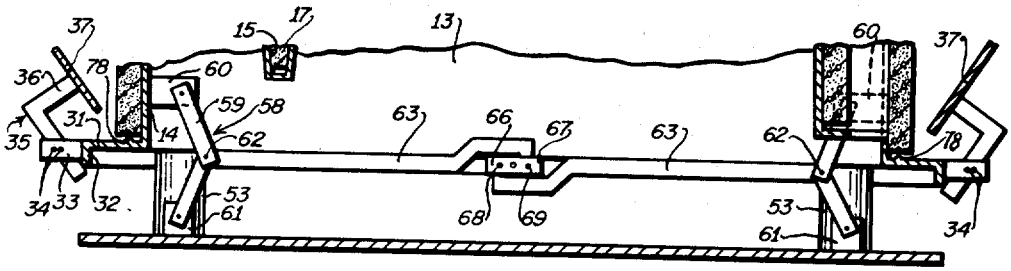
FIGURE 4 is a view similar to FIGURE 2 showing the mold lowered and the hardened concrete tank section stripped therefrom.
Figure 8:
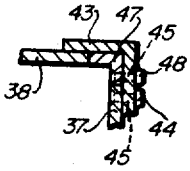
FIGURE 8 is a fragmentary sectional view showing the adjustable feature of the outer mold walls.

The lower edges of the core walls have, as shown in FIGURE 2, outwardly directed horizontal flanges 31 secured thereto as by welding or formed integrally with the core walls. As is evident flanges 31 define the bottom of the mold cavity. The outer edges 32 of the flanges are bent over and have secured thereto at equally spaced points support brackets 33 each having spaced inner and outer holes 34 to the innermost of which are pivoted, as by pins, arms 35 whose ends 36 above the pivot are secured to, and thereby support in spaced relation to the core walls, end and side outer wall forms 37 and 38 respectively of the mold which define the outer walls of the tank section. The other ends 39 of the arms extend below the pivot pins and as shown in FIGURES 4 and 5 are adapted to engage the bent over flange edge 32 thereby to limit the outward movement of the outer wall forms to a predetermined acute angle. As shown in FIGURES 1 and 2 the upper edges of the outer wall forms which extend a predetermined distance above the top 12 of the mold core, depending on the thickness of tank wall desired, are bent outwardly forming flanges 40. With reference to FIGURE 1 the flanges 40 on the end wall forms 37 extend beyond the edges of the side wall forms 38 whereas the flanges on the side wall forms 38 extend only to the edges of the end wall forms 37. The side wall form flanges have secured on their ends overlying extensions 41 which, when the wall forms are closed, overlie the ends of the end wall form flanges whereby removable pins 42 fited into holes in the flange extension may secure the wall forms in closed position. Further as shown in FIGURES 1 and 8 angle irons 43 secured to the vertical edges of the end wall forms 37 as by bolts 44 through the outermost of spaced holes 45 enclose the adjacent edges of the side and end wall forms 37 and 38 of the mold.

In the position shown the outer wall forms 37 and 38 are spaced from the mold core walls to form a rectangular tank section with, for example, a 3″ wall thickness. If a 4″ wall, for example, is required, the outer wall forms may be pivoted to the outermost of the holes 34 in the support brackets 33 thereby increasing the spacing between core walls and outer wall forms to 4″. As the angle irons 43 are also provided with double sets of holes 45 they also will be shifted outwardly and then secured by the bolts 44 to the end wall forms through the innermost set of holes 45 after the wall forms are moved out. As shown in FIGURE 8, to accommodate the space between the now separated adjacent edges of the side and end wall forms inserts 47 are inserted and secured to the angle irons 43 as by bolts 48 extending through the outermost of the sets of holes 45.

The end outer wall forms 37 of the mold have on their internal surfaces bosses 49 which extend toward the core walls a predetermined distance such that the walls of the formed tank section opposite thereto, being thinner may be knocked out thereby to provide inlet and outlet ports 16 and 50 (FIGURE 7), the latter being spaced below the former aproximately 3″.

Figure 3:
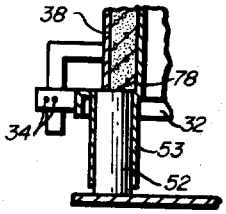
FIGURE 3 is a partial cross sectional view showing the inter-relationship of elements when the mold apparatus is in the FIGURE 2 position.

With reference now to FIGURES 1, 2 and 3 the mold apparatus is shown supported above a rectangular base frame 51 which is adapted to rest on a fixed reference plane or be secured thereto. Secured to the corners of the base frame 51 beneath the flanges 31 extending from the core side walls 13 are columnar supports 52 which extend upwardly through bearing sleeves 53 secured beneath the flanges 31 and into the mold cavity through complementary cutouts 54 in the flanges. As shown in FIGURES 1, 2 and 3 the top of the columnar supports 52 are flush with the top surface of the flanges when the apparatus is in a raised position such that when the outer wall forms 37 and 38 are positioned to form a mold cavity the lower edges 56 of the side outer wall forms 38 overlie the columnar supports. With this arrangement it is apparent that the mold cannot be lowered as long as the outer wall forms are positioned for a pour. Conversely the outer wall forms cannot be raised to cavity forming position as will be evident from FIGURE 5 until the mold apparatus is raised to pouring position.

Figure 6:
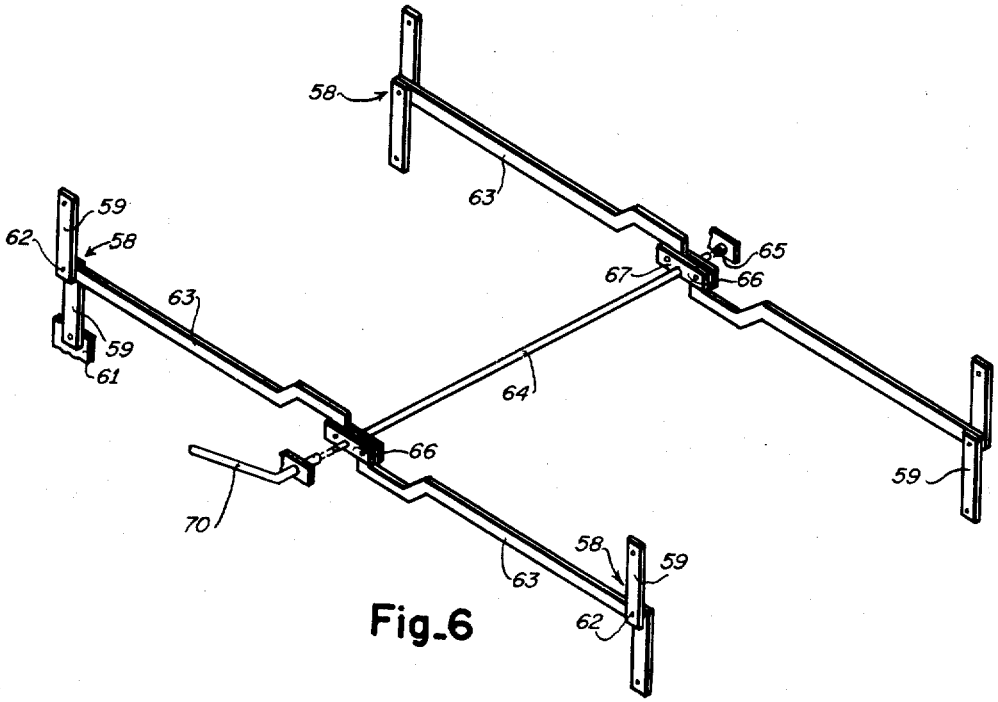
FIGURE 6 is a perspective view of the mold supporting mechanism and operating system therefor.

Referring now to FIGURE 6 in particular as well as to FIGURES 2 and 4 the mold support structure is shown which enables the mold to be moved downwardly from the FIGURE 2 to the FIGURE 4 position; the columnar supports 52 serving as guides. More particularly the support structure comprises a toggle 58 adjacent each corner with the opposite ends of the links 59 forming the toggles pivoted as by pins to support brackets 60 and 61 secured respectively to the internal end walls of the mold core and to the base frame 51. The common ends of the toggle links 59 are articulately connected as by pins 62 to one end of associated links 63 which extend toward a horizontal cross shaft 64. The cross shaft is mounted in bearing supports 65 secured to the edges of the flanges 31 extending from the side wall forms 38 at points intermediate the end wall forms 37 of the mold core.

Secured to the cross shaft 64 adjacent the internal side walls of the core and in the plane of action of the toggles are crank arms 66 and 67 extending toward the ends of the mold. The other ends of the links associated with the toggles at the left of the mold as viewed in the figures are pivotally secured as at 68 to crank arms 66 and the other ends of the links associated with the toggles at the right end of mold are pivotally secured as at 69 to crank arms 67. As shown in FIGURE 1 the cross shaft 64 extends through the flange end on one side of the mold and is adapted to be rotated by a hand lever 70 (FIGURE 1) whereby torque may be applied to turn the crank arms.

The normal raised position of the mold apparatus preparatory to receiving a pour is as shown in FIGURE 1 or after receiving a pour is as shown in FIGURE 2. This position obtains until the cement mix hardens which takes on the order of 20–24 hours. In the normal or pour position, FIGURE 2, it will be noted that the toggles 58 are straight with all pivot centers on a vertical line. Further it is to be noted that the pivot centers of the link toggle connections, the link crank connections, and the shaft center are similarly horizontally aligned thereby giving stability to the mold support structure. Further as the crank arms are short, the link and crank arms form a relatively rigid connection between the knees of the toggles and shaft, resisting any tendency of the toggles to break should their pivot centers be misaligned.

Figure 9:
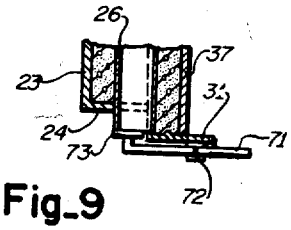
FIGURE 9 is a fragmentary sectional view showing the baffle forming sleeve stripping mechanism.

After the cement has hardened, reference being directed to FIGURE 9, a foot lever 71 pivotally secured as at 72 to the flange 31 extending from one of the end wall forms 37 is depressed so that its working end 73 will force the sleeve 26 upwardly stripping it from the outlet baffle channel. Thereafter, the pins 42 securing the outer mold wall forms are removed and the wall forms pulled open whereby the lower edges 56 (FIGURE 5) of the side wall forms 38 move away from the columnar supports 52 thereby to permit the mold to be subsequently forced down. Thereafter the hand lever 70 is turned through 180°, the force applied being multiplied by the short crank arms 66 and 67. The clockwise movement of the crank arms simultaneously pulls the links to opposite sides of the shaft thereby breaking all the toggles simultaneously and since the great weight of the concrete acts through the supports 52 to maintain the base frame stationary the mold is forcibly pulled relative to and guided by the columnar supports to the position shown in FIGURES 4 and 5; the downward movement of the mold breaking the bond between the mold core and the inner walls of tank section. It is to be here noted that the weight of the mold aids in the downward movement such that the force required is simply that necessary to break the concrete bond. The stripping movement need only be on the order of an inch sufficient to clear the internal walls of the tank section from the slightly outwardly tapered walls of the mold core, the tapered walls providing clearance so that when cables 74 are attached and retained in grooves 75 (FIGURE 7) formed in the outer tank end walls by projections 76 (FIGURE 2) on the inner surface of the end wall forms 37, a crane hoist (not shown) may be secured to the cables thereby to raise the tank section without undue interference.

As will be noted with reference to FIGURES 2–5 the flanges 31 forming the bottom of the mold cavity as well as the top of supports 52 are shaped to provide either a rib or a groove 78 which will fit a groove or rib as the case may be in a bottom tank section to facilitate joining the tank sections.

As hereinbefore stated the mold herein is formed of sheet steel preferably of welded construction except as otherwise noted and though not illustrated may be reenforced with vertical supporting ribs to lend rigidity to the forms as will be understood.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for molding concrete tank sections comprising a rigid substantially rectangular core having top, side, and end walls, flanges secured to the lowermost edges of said side and end walls, and outer wall forms spaced from the side and end walls of said core and hingedly supported by said flanges, said flanges having openings adjacent each corner of the mold cavity formed by said core, walls and flanges, a base support, columnar supports extending from said base support into said openings and partially defining the bottom of said mold cavity, toggle mechanisms adjacent said columnar supports connected to said core and base support and adapted in straightened condition to evenly support said core in a raised position, crank arms, links connecting said toggle mechanisms to said crank arms, and means for operating said crank arms simultaneously whereby said toggles are broken and said mold apparatus lowers to said base support relative to said columnar supports thereby to strip said mold apparatus from a product formed in the mold cavity.

2. Apparatus for molding concrete septic tank sections comprising a substantially rectangular core having top, side and end walls, flanges secured to and extending outwardly of the lowermost edges of said side and end walls, and outer wall sections hingedly secured to said flanges movable to a closed position to define a mold cavity and to an open position to permit stripping of a formed product from said core and flange, said side wall flanges having openings in and adjacent the ends thereof and located as to underlie said outer wall sections, guide columns extending vertically into said openings partially defining the bottom of said mold cavity and adapted when said apparatus is lowered from a raised position after said wall sections are moved outwardly to evenly support the tank formed in said mold cavity, a plurality of bistable means operable in one stable state for releasably evenly supporting the weight of said molding apparatus and the weight of said tank material in a raised position, and means for positively simultaneously urging said releasable supporting means to their other stable state, whereby said mold apparatus is forcibly pulled downward relative to said columns thereby to break the bond between and thereby to permit said mold to separate of its own weight from said product, said columns after removal of a stripped tank preventing movement of said outer wall sections to mold cavity forming position until restoration of said core and flange to its initial position.

3. Apparatus for molding concrete septic tank sections comprising a substantially rectangular core having top, side and end walls, a flange secured to the lowermost edges of the side and end walls, and outer wall sections hingedly secured to said flange adapted in a closed position to define a mold cavity with said core and flange, a base support member, stationary guide columns extending into openings in and partially defining the bottom of said mold cavity and adapted to evenly support a formed and hardened tank section, toggles secured to the interior walls of said core and to said base support member for releasably supporting said mold apparatus, a shaft secured for rotation in said flange extending from side to side and intermediate the ends of said core, crank arms secured to said shaft adjacent each side wall,
links connecting said crank arms and toggles,
and lever means for rotating said shaft whereby said toggles are straightened and broken to raise and lower said mold apparatus respectively relative to said guide columns.

4. Apparatus for molding concrete septic tank sections comprising a mold core having top, side and end walls,
laterally extending flanges secured to the lowermost edges of said core walls,
end and side outer wall forms adapted to be hingedly secured to said flanges in one of two positions, said second position permitting a wider spacing between core walls and outer wall forms,
angle irons adapted to be secured to said end outer wall forms in one of two positions corresponding to said outer wall positions, said angle irons being directed toward said side forms to envelope the adjacent edges of said outer wall forms,
and means forming an extension of said end forms adapted to be secured to said angle irons when said wall forms and angle irons are in said second position, thereby to close the gap between adjacent edges of said wall forms when moved to said second position.

5. Apparatus for separating a formed concrete product from a mold, said mold comprising a substantially rectangular enclosure having bottom, side and end walls,
a substantially rectangular rigid core having top, side and end walls disposed within said rectangular enclosure, said side and end walls of said core and enclosure being separated a predetermined distance thereby defining with the bottom of said enclosure a mold cavity,
a base support member,
columnar supports secured to said base support member and extending upwardly into and adjacent the corners of said mold cavity adapted to guide said mold for vertical movement relative to said base support member and to evenly support the weight of a product formed in said mold cavity during and subsequent to downward movement of said mold,
a toggle adjacent each internal corner of said core, the links of said toggles being pivotally connected to said core and to said base support member,
a cross shaft rotatably supported by said mold intermediate the ends of said side walls,
crank arms associated with each of said toggles secured to said shaft,
links articulately connecting associated crank arms and the common ends of said toggle links,
and means for rotating said shaft in one direction thereby to break said toggles and forcibly break the adhesive bond between core and hardened tank section whereby the mold may lower relative to said columnar supports, and in an opposite direction thereby to straighten said toggles and thereby raise said mold.

6. Apparatus as recited in claim 5 wherein the side and end walls of said enclosure are hingedly mounted to the bottom of said enclosure for movement to a closed pour position and to an open stripping position, and wherein said columnar supports underlie the lower edges of said enclosure side walls.

7. Apparatus for molding concrete tank sections comprising a rigid substantially rectangular core defining the inner walls of a tank section,
integral flanges extending horizontally from and about the periphery of the bottom edge of said core defining the bottom edge of a tank section,
a plurality of actuatable bistable control means for evenly releasably supporting the weight of said core and flange in a raised position relative to a horizontal reference plane when in one stable state and adapted when actuated toward their other stable state to exert downward pull on and to release said core for movement toward said reference plane of its own weight,
a plurality of stationary guide columns extending upwardly into openings in and partially defining the surface of said flange, said columns being adapted to evenly support the weight of a formed and hardened tank section during downward movement of said core,
and means for simultaneously applying sufficient actuating force to each of said control means thereby to forcibly overcome the bond of adhesion between said core and a formed tank section whereby said core may lower of its own weight toward said reference plane.

8. Apparatus for molding concrete tank sections comprising a rigid substantially rectangular core structure defining the inner walls of a tank section,
horizontal flanges secured about the periphery of the bottom edge of said core structure defining the bottom edges of a tank section, and wall forms hingedly secured to said flanges adapted when closed to define the outer walls of a tank section and adapted when opened to permit separation of said core structure and formed tank section,
stripping mechanism releasably supporting said core, flange and wall forms for movement relative to a reference plane,
guide columns extending from said reference plane into the cavity between said core and wall forms and underlying said closed wall forms, said columns supporting the weight of said tank section when said core, flange, and open wall forms are moved,
and means operative on said stripping mechanism for urging said core, flange, and open wall forms to move toward said reference plane, whereby the bond between said tank section and said core structure is broken thereby permitting said core structure, flange and open wall forms to move downwardly relative to said columns.

9. Apparatus for separating a formed product from its mold, said mold comprising a substantially rectangular enclosure having a bottom, and side and end walls hingedly connected to said bottom,
a substantially rectangular rigid core having top, side and end walls disposed within said rectangular enclosure, said side and end walls of said core and enclosure being separated a predetermined distance thereby defining with the bottom of said enclosure a mold cavity,
a base support member,
columnar supports secured to said base support member and extending into said mold cavity adapted to guide said mold for vertical movement relative to said base support member and to evenly support the weight of a product formed in said cavity during and subsequent to movement of said mold,
mold stripping mechanism releasably supporting said mold for movement between two stable positions,
and means operable on said tripping mechanism to urge said mold toward said base support member whereby the bond between said supported product and mold is broken thereby permitting said mold to move from one to the other of its stable positions.

*10. Apparatus for separating a formed concrete product from a mold having bottom and side walls defining a mold cavity,*
*a base support member,*
*columnar supports secured to said base support member and extending into said mold cavity adapted to guide said mold for vertical movement relative to said base support member and to evenly support the weight of a product formed in said cavity during and subsequent to movement of said mold,*

*mold stripping mechanism releasably supporting said mold for movement between two stable positions,*

*and means operable on said stripping mechanism to urge said mold toward said base support member whereby the bond between said supported product and mold is broken thereby permitting said mold to move from one to the other of its two stable positions.*

*11. Apparatus for separating a formed concrete product from its mold, said mold comprising bottom and side walls defining a mold cavity,*

*a base support member,*

*stripping mechanism releasably supporting said mold for movement relative to said base support member,*

*guide columns extending from said base support member into the mold cavity,*

*and means operative on said stripping mechanism for urging said mold to move toward said base support member whereby the bond between said mold and said formed product is broken thereby permitting said mold to move downwardly relative to said columns.*

*12. Apparatus as recited in claim 11 wherein said stripping mechanism releasably supporting said mold comprise toggles pivotally connected to said mold and said base support member.*

*13. Apparatus for separating a formed concrete product from a mold, said mold comprising a rigid core having top and side walls and a surrounding enclosure having side walls and a bottom, said bottom being secured to the lower extremities of said core side walls, said core and enclosure walls defining a mold cavity,*

*a base support member,*

*guide columns secured to and extending vertically from said base support member into said mold cavity and adapted when said mold is lowered from a raised position to evenly support the formed product,*

*a plurality of bistable means operable in one stable state for releasably evenly supporting said mold and said product material while said mold is in a raised position,*

*and means for positively simultaneously urging said releasable supporting means to their other stable state whereby said mold apparatus is forcibly pulled downward relative to said columns thereby to break the bond between and thereby to permit said mold to separate of its own weight from said product.*

*14. Apparatus as recited in claim 13 wherein said bistable means for releasably supporting said mold comprise toggles pivotally connected to said mold and to said base support member.*

*15. Apparatus for molding concrete tank sections comprising a rigid core having top and side walls, a flange secured to the lowermost edges of said side walls, and outer wall sections hingedly connected to said flange adapted in a closed position to define a mold cavity with said core and flange,*

*a base support member,*

*stationary guide columns secured to and extending vertically from said base support member into openings in and partially defining the bottom of said mold cavity and adapted to evenly support a formed and hardened tank section,*

*toggles secured to the interior of said core walls and to said base support member for releasably supporting said mold apparatus,*

*a shaft secured for rotation in said flange,*

*crank arms secured to said shaft,*

*links connecting said crank arms and toggles,*

*and lever means for rotating said shaft whereby said toggles are straightened and broken to raise and lower said mold apparatus respectively relative to said guide columns.*

References Cited by the Examiner

The following references, cited by the Examiner, are of record in the patented file of this patent or the original patent.

UNITED STATES PATENTS

| | | | |
|---|---|---|---|
| 710,391 | 9/02 | Haws | 25—130 |
| 1,375,328 | 4/21 | Sheeley | 25—131 |
| 2,578,310 | 12/51 | Lager | 25—130 |
| 2,623,259 | 12/52 | Schuh | 25—130 |
| 2,713,710 | 7/55 | Holland | 25—120 |
| 2,894,311 | 7/59 | Sinclair | 25—130 |
| 2,903,777 | 9/59 | Mitchell | 25—130 |

WILLIAM J. STEPHENSON, *Primary Examiner.*